United States Patent Office 3,474,073
Patented Oct. 21, 1969

3,474,073

MAGNETIC COATING COMPOSITION WITH FOUR COMPONENT EPOXY BINDER

Louis M. Higashi, Monte Sereno, Calif., assignor to Memorex Corporation, Santa Clara, Calif., a corporation of California No Drawing. Continuation-in-part of application Ser. No. 619,017, Feb. 27, 1967. This application June 11, 1968, Ser. No. 735,997

Int. Cl. C08g *51/02;* G11b *5/70*

U.S. Cl. 252—62.54 6 Claims

ABSTRACT OF THE DISCLOSURE

A fluid, heat curable magnetic coating composition in which magnetic particles are dispersed in a four component thermosetting epoxy binder. The coating also contains volatile solvents and a flow control agent which preferably includes epoxy groups which chemically bind the flow control agent to the binder when the binder is cured. The epoxy binder contains (1) a high equivalent weight epoxy with a molecular weight of about 400–4000 per epoxy group, (2) a low equivalent weight epoxy with a molecular weight of about 130–1211 per epoxy group, (3) a large proportion of an amine aldehyde condensation product having secondary amine groups, and (4) a smaller proportion of a poly amine having primary amine groups.

This application is a continuation-in-part of my copending application Ser. No. 619,017, filed Feb. 27, 1967 and now abandoned.

Summary of invention

Magnetic coating compositions have been made with a wide variety of binder systems both thermoplastic and thermosetting, and many of these magnetic coatings have very desirable properties for particular applications. However, substantially all of these magnetic coatings have disadvantages from the standpoint of their magnetic properties, their physical ability to withstand abrasion, and their processing characteristics, that is the techniques which are required for their application to supporting members.

The requirements of a magnetic coating composition are particularly stringent where the composition is to be employed for making the magnetic recording layers for "flying head" memories such as the IBM 1311 Disk Storage drives. In memories of this type, a magnetic layer is provided on a rigid disk, usually made of aluminum, and the disk is rotated at speeds of about 1,500 r.p.m. while a magnetic head is supported adjacent to the disk and caused to fly aerodynamically over the disk surface. These high rotational speeds of the disk, together with the high relative speeds of head and disk surface cause most magnetic coatings to shed magnetic oxide from the coating ultimately resulting in head crashing and damage to the magnetic heads and coatings. Lack of hardness, adhesion to aluminum, impact resistance, toughness and resistance to solvents which are commonly used in cleaning the disks are other shortcomings frequently encountered with most magnetic coatings.

In accordance with this invention, a magnetic coating composition is provided which is particularly useful as the magnetic coatings for the memory storage disks of the abovementioned type. The coating provides a magnetic recording surface on the disk with sufficiently good mechanical properties that the coated disks can be used substantially indefinitely without head crashing and without loss of magnetic signals. Additionally, the coatings are resistant to the solvents commonly used in cleaning the disks, and the coatings may be applied to disks by a wide variety of techniques including spin coating, roll coating, knife coating, and spray coating.

A tough, non-dusting magnetic coating with excellent solvent resistance and good adhesion to aluminum is prepared by curing a magnetic dispersion containing a binder of a mixture of a high equivalent weight epoxy polymer, a low equivalent weight epoxy polymer, and a mixture of an alkylated amine aldehyde condensation product and a primary amine.

The high equivalent weight epoxy polymer has an average of between one and three epoxy groups per molecule and a molecular weight per epoxy group of between about 400–4000. Preferably the high weight epoxy polymer is a condensation polymer of epichlorohydrin and bisphenol A having the general formula

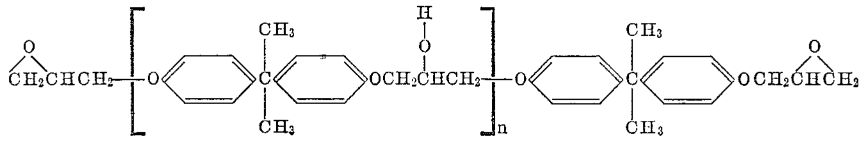

where *n* is an integer between about 2 to 10. The preferred condensation polymer of epichlorohydrin and bisphenol A which is employed in the practice of this invention is a product sold by the Shell Chemical Company under the trademark Epon 1001 which has an epoxide equivalent of 425–550 and melting point of 65–75° C. Other polymers which may be used in place of the Epon 1001 are Shell Chemical Company Epon 1007, having an epoxide equivalent weight of 1900–2450 and melting point of 125–135° C., and Dow Chemical D.E.R. 661, Ciba Araldite 6071, Union Carbide Plastics ERR–2011, General Mills Gen Epoxy 525, Jones-Dabney Epi-Rez #520 and Reichhold Epotuf 6301. Additionally, the following commercially available polymers may be used in lieu of the Epon 1001: Shell Epon 1004, General Mills Gen Epoxy 925, Dow D.E.R. 664, Ciba Araldite 6084, Union Carbide Plastics ERR 2013, Jones-Dabney Epi-Rez 530–C and Reichhold Epotuf 6304.

The low equivalent weight epoxy polymer contains an average of between three and four epoxy groups per molecule and has a molecular weight per epoxy group of between about 130–1211. The preferred low equivalent weight epoxy polymer is an epoxylated phenolic novolac sold by the Dow Chemical Company under the trademark D.E.N. 438 and has the general formula

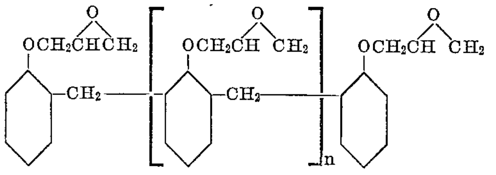

where *n* has an average value of 1.6. D.E.N. 438 has an average molecular weight of 571 and an average equivalent weight of 159. In place of the D.E.N. 438 the following commercially available plastics may be used: Dow Chemical D.E.N. A85 and D.E.N. EK85 which are 85% solids solution in acetone and methylethylketone respectively, Ciba EPN 1138 and EPN 1139, and Union Carbide Plastics ERR–0100.

The amine aldehyde condensation product is a poly amine having a preponderance of secondary amine groups and preferably at least three amine groups per molecule. The preferred amine aldehyde condensation product is an alkylated melamine-formaldehyde conversion resin sold by the Monsanto Chemical Company under the trademark Resimene RF 5307 as a 90% solids solution in isopropanol. This resin has the following structural formula for its monomer.

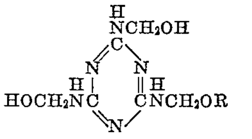

where R may be an alkyl group of from one to four carbon atoms. While this is the structural formula for the monomer, the resin contains appreciable amounts of dimers and trimers of this structure. The molecular weight of the monomer is 272 and the equivalent weight is 91. In place of the RF 5307, the following commercially available resins may be used: American Cyanamid Cymel 350 and Monsanto Resimene RF 5306 and butylated urea-formaldehyde condensation polymers such as Monsanto UF–901, American Cyanamid Beetle 227–8, and Reichhold Beckamine P138–60.

The polyamine has at least one primary amine group per molecule, and the presence of this primary amine in the binder mixture has been found to be essential to the provision of satisfactory coatings. Absent the primary amine, the amine aldehyde condensation product undergoes homopolymerization at temperatures below the copolymerization temperature of the epoxy polymers and the amine aldehyde condensation product. The preferred poly amine with primary amine groups is N-aminoethylpiperazine which has the following general formula with a molecular weight of 130 and equivalent weight 43.3:

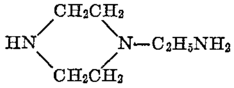

In place of the N-aminoethylpiperazine, the following polyamines may be used: N-(trimethoxysilylpropyl)ethylenediamine, diethylenetriamine and ethylenediamine.

When the epoxy binder is thermally cured, the amine groups in the amine aldehyde condensation product and in the polyamine react with the epoxy groups in the two epoxy polymers to provide a thermoset polymer matrix which is adherent to substrates such as aluminum and which forms an excellent binder for the magnetic particles. The amine and epoxy polymers are preferably provided in approximately stoichiometric quantities, but an excess of either can be used, that is the epoxy polymers are present in a sufficient amount that the combined number of epoxy groups in the polymers is between about 0.5 and 1.5 times the total number of hydrogen atoms on the primary and secondary amine groups in the polyamine and the condensation product.

The two epoxy polymers are preferably employed in sufficient amounts that they contribute approximately equal numbers of epoxy groups to the coating composition, and these amounts may be varied to some extent so that the ratio of the number of epoxy groups in the high equivalent weight polymer to the number of epoxy groups in the low equivalent weight polymer is within the range between about 3 to 1 and 1 to 3. Excessive amounts of the high equivalent weight polymer causes a tendency to dust in the cured epoxy coating, and excessive amounts of the low equivalent weight epoxy polymer results in embrittlement of the coating.

The polyamine with primary amine groups should be used in a sufficient amount that the number of primary amine groups in the polyamine is between about 3 and 15 percent of the total number of epoxy groups in the two polymers. Where an insufficient quantity of primary amine is employed, homopolymerization of the amine aldehyde condensation product results, and where excessive amounts of the primary amine are employed the pot life of the coating composition is seriously reduced. Where the N-aminoethylpiperazine is employed as the polyamine, it is employed in an amount such that the equivalent ratio of N-aminoethylpiperazine to total epoxide in the polymers is between 0.1 and 0.4 and preferably about 0.2. The butylated melamine-formaldehyde condensation product is preferably used in an amount of 15 percent of the total weight of melamine and epoxy polymers.

Flow control agents are normally incorporated in highly pigmented coatings such as magnetic dispersions to serve a dual purpose of preventing the formation of pinholes in the cured coating and to promote adequate flow to smooth out surface defects such as orange peel and streaking. In accordance with this invention, a flow control agent is used which is preferably either one of the two following epoxy silane formulas: 3,4-epoxycyclohexylethyltrimethoxy silane having the general formula

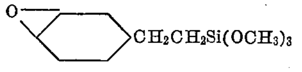

and glycidoxypropyltrimethoxysilane, having the general formula

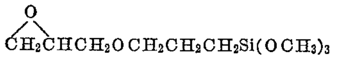

The former of these silanes is sold by the Union Carbide Company under the trademark A–186 Silane and the latter is sold by the Union Carbide Company under the trademark A–187 Silane.

Other flow control agents may be used, but their effectiveness is substantially poorer than the epoxy silanes mentioned above. Other flow control agents include General Electric SR82 silicone resin and Dow Corning DC840 which is a methylphenylpolysiloxane. The epoxy silanes provides most effective flow control prior to cure of the coating, and the epoxy groups on these silanes chemically bond the flow control agent to the binder so that the flow control agent does not adversely effect the properties of the cured coating.

The use of these silanes in the specific coatings mentioned below resulted in cured coatings with as-coated arithmetic average surface roughness of 8 to 14 microinches as measured on a profilometer. Ultimately such surfaces were easily polished to a surface roughness of approximately 2 microinches.

Magnetic coating compositions prepared in accordance with this invention and containing magnetically susceptible particles may be applied to flexible substrates such as Mylar or to rigid substrates such as aluminum or plastic plates employing such techniques as roll coating, knife coating, spin coating, and spray coating. Magnetic oxide particles are preferably incorporated into such coating compositions in amounts between about 60 and 120 parts by weight of magnetic oxide particles per 100 parts of the binder with between about 100 and 400 parts of volatile solvents per 100 parts of the combined weight of binder and magnetic oxide particles. Various types of magnetically susceptible pigments may be employed, however, the magnetic pigment which was used in the example set forth below had the following magneitc properties when measured on a 60 cycle hysteresis loop tracer, using a symmetrical cyclic magnetic field of 1000 oersteds.

| Magnetic property: | Value |
|---|---|
| Residual saturation (Br) ------Gauss-- | 1750–2100 |
| Maximum saturation (Bm) ----do---- | 3300–3600 |
| Coercive force (Hc) --------oersteds-- | 275–300 |

Detailed description

The following examples are set forth to better illustrate the preparation of magnetic recording media in accordance with this invention. The quantities which are presented are parts by weight unless otherwise specified. Example I represents the general process which was followed to produce the magnetic coatings. Examples II through X were processed in a manner similar to that in Example I and all resulted in coated disks which were non-dusting and permitted heads to fly continually without crashing.

EXAMPLE I

| Component | Proportions | Solids |
|---|---|---|
| Magnetic oxide | 45.1 | 45.1 |
| 60% Epon 1001 in Cellosolve | 55.2 | 33.1 |
| 85% D.E.N. 438 in methylethylketone | 14.4 | 12.2 |
| 90% Resimene RF5307 in isopropanol | 9.0 | 8.1 |
| 100% N-aminoethylpiperazine | 1.2 | 1.2 |
| 60% SR-82 silicone resin in xylene | 0.5 | 0.3 |
| 80/10/10 Cellosolve/hexanol-1/xylene | 98.0 | ------- |
| Totals | 223.4 | 100.0 |

A magnetic dispersion was prepared from the foregoing formulation in the following manner:

A mixture of 45.1 parts of magnetic pigment and 56.5 parts of solvent was mixed with a high speed mechanical stirrer and allowed to wet out by standing overnight. Subsequently, 36.3 parts of 60% Epon 1001 solution in Cellosolve were added to the pigment slurry and then milled until free of agglomerates. This mill base was then let down with a mixture containing 0.5 part of 60% SR 82 silicone resin solution, 14.4 parts of 85% D.E.N. 438 solution, 9.0 parts of 90% Resimene RF 5307, 18.9 parts of 60% Epon 1001 solution and 34.0 parts of 80/10/10 Cellosolve/hexanol-1/xylene solvent. Finally, 1.2 parts of N-aminoethylpiperazine are added together with 7.5 parts of 80/10/10 Cellosolve/hexanol-1/xylene solvent for adjustment of viscosity to approximately 360 cps. at 25° C. as measured by a Brookfield viscometer using a #2 spindle at a speed of 20 r.p.m.

The coating was then applied to aluminum disks, prebaked for 15 minutes at 105° C. and cured for 4 hours at 185° C. Upon cooling the coating was polished to a roughness of approximately 2 to 3 microinches. Several complete disk storage packs each containing four parallel disks with eight storage surfaces and two outer-disks each containing one storage surface were assembled for testing.

The disks when tested on an IBM 1311 Disk Pack drive which was connected to a 1401 computer with 6 programs ran error free at high speed for over eight hours of testing without any evidence of wear, dusting or head-crashing. No measurable deterioration in magnetic performance was observed at the end of the testing period.

EXAMPLE II

| Component | Proportions | Solids |
|---|---|---|
| Magnetic oxide | 40.0 | 40.0 |
| 70% Epon 1004 in Cellosolve | 47.5 | 33.2 |
| 85% D.E.N. 438 in methylethylketone | 9.3 | 7.9 |
| 90% Resimene RF 5306 in isopropanol | 19.6 | 17.6 |
| 100% N-aminoethylpiperazine | 0.7 | 0.7 |
| 60% SR-82 silicone resin in xylene | 1.0 | 0.6 |
| 74/13/13 Cellosolve/hexanol-1/xylene | 105.3 | ------- |
| Totals | 223.4 | 100.0 |

EXAMPLE III

| Component | Proportions | Solids |
|---|---|---|
| Magnetic oxide | 40.0 | 40.0 |
| 60% Epon 1001 in Cellosolve | 60.0 | 36.0 |
| 85% D.E.N. 438 in methylethylketone | 15.7 | 13.3 |
| 90% Resimene RF 5306 in isopropanol | 9.8 | 8.8 |
| 100% N-aminoethylpiperazine | 1.3 | 1.3 |
| 60% SR-82 silicone resin in xylene | 1.0 | 0.6 |
| 50/50 methylcarbitol/toluene | 95.6 | ------- |
| Totals | 223.4 | 100.0 |

EXAMPLE IV

| Component | Proportions | Solids |
|---|---|---|
| Magnetic oxide | 45.0 | 45.0 |
| 60% Epon 1001 in Cellosolve | 54.6 | 32.8 |
| 85% D.E.N. 438 in methylethylketone | 14.1 | 12.0 |
| 90% Resimene RF 5307 in isopropanol | 8.9 | 8.0 |
| 100% N-aminoethylpiperazine | 1.1 | 1.1 |
| 100% A-186 silane | 1.1 | 1.1 |
| 30/70 toluene/methylcarbitol | 98.6 | ------- |
| Totals | 223.4 | 100.0 |

EXAMPLE V

| Component | Proportions | Solids |
|---|---|---|
| Magnetic oxide | 45.0 | 45.0 |
| 60% Epon 1001 in Cellosolve | 54.6 | 32.8 |
| 85% D.E.N. 438 in methylethylketone | 14.1 | 12.0 |
| 90% Resimene RF 5307 in isopropanol | 8.9 | 8.0 |
| 100% N-aminoethylpiperazine | 1.1 | 1.1 |
| 60% DC-840 silicone resin in toluene | 1.8 | 1.1 |
| 50/50 methylcarbitol/toluene | 97.9 | ------- |
| Totals | 223.4 | 100.0 |

EXAMPLE VI

| Component | Proportions | Solids |
|---|---|---|
| Magnetic oxide | 45.0 | 45.0 |
| 60% Epon 1001 in toluene | 54.6 | 32.8 |
| 85% D.E.N. 438 in methylethylketone | 14.1 | 12.0 |
| 90% Resimene RF 5307 in isopropanol | 8.9 | 8.0 |
| 100% N-aminoethylpiperazine | 1.1 | 1.1 |
| 60% DC-840 silicone resin in toluene | 1.8 | 1.1 |
| 50/50 methylcarbitol/toluene | 97.9 | ------- |
| Totals | 223.4 | 100.0 |

EXAMPLE VII

| Component | Proportions | Solids |
|---|---|---|
| Magnetic oxide | 45.0 | 45.0 |
| 60% Epon 1001 in toluene | 55.0 | 33.0 |
| 85% D.E.N. 438 in methylethylketone | 14.1 | 12.0 |
| 90% Resimene RF 5307 in isopropanol | 8.8 | 7.9 |
| 100% N-aminoethylpiperazine | 1.1 | 1.1 |
| 100% A-186 silane | 1.0 | 1.0 |
| 20/80 diethylcarbitol/1-notropropane | 60.7 | ------- |
| Totals | 185.7 | 100.0 |

EXAMPLE VIII

| Component | Proportions | Solids |
|---|---|---|
| Magnetic oxide | 45.0 | 45.0 |
| 60% Epon 1001 in toluene | 55.0 | 33.0 |
| 85% D.E.N. 438 in methylethylketone | 14.1 | 12.0 |
| 90% Resimene RF 5307 in isopropanol | 8.8 | 7.9 |
| 100% N-aminoethylpiperazine | 1.1 | 1.1 |
| 100% A-187 silane | 1.0 | 1.0 |
| 20/80 diethylcarbitol/1-nitropropane | 60.7 | ------- |
| Totals | 185.7 | 100.0 |

EXAMPLE IX

| Component | Proportions | Solids |
|---|---|---|
| Magnetic oxide | 34.4 | 34.4 |
| 60% Epon 1001 in solvent [1] | 42.73 | 25.638 |
| 85% D.E.N. 438 in MEK | 5.544 | 4.712 |
| 90% Resimene 740 in isopropanol | 3.750 | 3.375 |
| 100% N-aminoethylpiperazine | 0.670 | 0.670 |
| Additional solvent [1] | 58.536 | ------- |

[1] Solvent is 80 parts Cellosolve, 10 parts xylene and 10 parts hexanol.

EXAMPLE X

| Component | Proportions | Solids |
|---|---|---|
| Magnetic oxide | 50.0 | 50.0 |
| 40% Epon 1007 in Cellosolve | 115.27 | 96.1 |
| 85% D.E.N. 438 in MEK | 2.24 | 1.90 |
| 90% Resimene 740 in IPA | 1.92 | 1.73 |
| 100% N-aminoethylpiperazine | 0.27 | 0.27 |
| Solvent 80:10:10 | 116.64 | ------- |

The magnetic oxide used in Examples IX and X was gamma ferric oxide sold under the trademark MO-2530 by Charles Pfizer Company.

While certain specific embodiments of this invention have been illustrated and described in detail herein, it is obvious that many modifications thereof may be made without departing from the spirit and scope of the invention.

I claim:

1. A magnetic coating composition containing magnetically susceptible particles dispersed in a fluid thermosetting binder where said binder comprises an intimate admixture of:

(A) a high equivalent weight epoxy polymer containing an average of between 1 and 3 epoxy groups per molecule and a molecular weight per epoxy group of between about 400 and 4000, (B) a low equivalent weight epoxy polymer containing an average of between 3 and 4 epoxy groups per molecule and a molecular weight per epoxy group of between about 130 and 1211, (C) an amine-aldehyde condensation product having more than two secondary amine groups per molecule, and (D) a polyamine having at least one primary amine group per molecule, (E) said epoxy polymers being provided in sufficient amounts that the ratio of the number of epoxy groups in the high equivalent weight polymer to the number of epoxy groups in the low equivalent weight polymer is within the range between 3 to 1 and 1 to 3, (F) said polyamine being present in a sufficient amount that the number of primary amine groups in said polyamine is between about 3 and 15 percent of the total number of epoxy groups in said polymers, and (G) the polymers being present in sufficient amounts that the combined number of epoxy groups in said polymers is between about 0.5 and 1.5 times the total number of hydrogen atoms on the primary and secondary amine groups in said polyamine and said condensative product.

2. The magnetic coating composition of claim 1 in which:

(A) said high equivalent weight epoxy polymer is a condensation polymer of epichlorohydrin and bisphenol A having the general formula

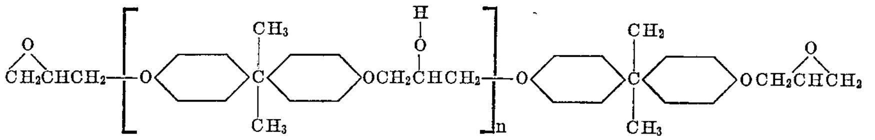

where $n$ is an integer from 2 to 10;

(B) said low equivalent weight epoxy polymer is an epoxylated phenolic novolac having the general formula

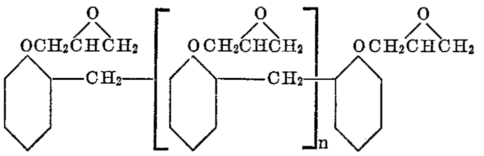

where the average value of $n$ is about 1.6;

(C) said condensation product is an alkylated melamineformaldehyde resin having the general formula

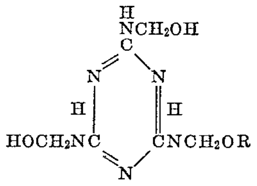

where R is an alkyl group containing about one to four carbon atoms, and;

(D) said polyamine is N-aminoethylpiperazine.

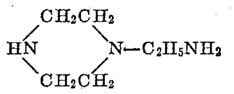

3. The magnetic coating composition of claim 1 characterized further by the inclusion of between about 1 and 5 weight percent, based on the weight of said binder, of an epoxy-silane flow control agent selected from the class consisting of 3,4 epoxycyclohexylethyl trimethoxy silane and glycidoxypropyl trimethoxy silane.

4. A fluid, heat curable magnetic coating composition comprising:

(A) an epoxy binder comprising:

(1) about 33 parts by weight of a condensation polymer of epichlorohydrin and bisphenol A having the general formula

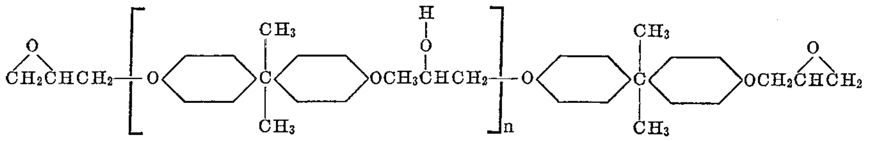

where $n$ is an integer from 2 to 10, (2) about 12 parts by weight of an epoxylated phenolic novolac having the general formula

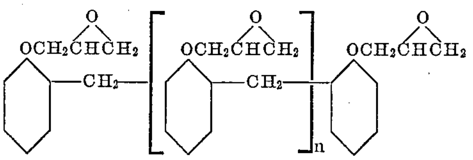

where the average value of $n$ is about 1.6;

(3) about 8 parts by weight of an alkylated melamine-formaldehyde resin having the general formula

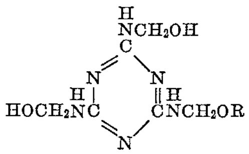

where R is an alkyl group containing about 1 to 4 carbon atoms, and (4) about 1 part by weight of N-aminoethylpiperazine, (B) between about 60 and 120 parts by weight of magnetic oxide particles per 100 parts of said binder and, (C) between about 100 and 400 parts, per 100 parts of the combined weight of said binder and particles, of volatile solvents with said binder and particles uniformly dispersed therein.

5. The magnetic coating composition of claim 4 characterized further by the inclusion of about one part by weight, per part by weight of said N-aminoethylpiperazine, of an epoxy-silane flow control agent selected from the class consisting of 3,4-epoxycyclohexylethyl trimethoxy silane and glycidoxypropyl trimethoxy silane.

6. A magnetic recording member comprising:

(A) a substantially rigid disc formed of a non-magnetic material, and (B) a heat cured coating on said disc with said coating containing magnetically susceptible particles bound in a binder where said binder contains chemically reacted together (1) a high equivalent weight epoxy polymer containing an average of between 1 and 3 epoxy groups per molecule and a molecular weight per epoxy group of between about 400 and 4000, (2) a low equivalent weight epoxy polymer containing an average of between 3 and 4 epoxy groups per molecule and a molecular weight per epoxy group of between about 130 and 1211, (3) an amine-aldehyde condensation product having more than two secondary amine groups per molecule, and (4) a polyamine having at least one primary amine group per molecule, (5) said epoxy polymers being provided in sufficient amounts that the ratio of the number of epoxy groups in the high equivalent weight polymer to the number of epoxy groups in the low equivalent weight polymer is within the range between 3 to 1 and 1 to 3, (6) said polyamine being present in a sufficient amount that the number of primary amine groups in said polyamine is between about 3 and 15 percent of the total number of epoxy groups in said polymers, and (7) the polymers being present in sufficient amounts that the combined number of epoxy groups in said polymers is between about 0.5 and 1.5 times the total number of hydrogen atoms on the primary and secondary amine groups in said polyamine and said condensative product.

References Cited

UNITED STATES PATENTS

| | | | |
|---|---|---|---|
| 3,148,082 | 9/1964 | Di Ricco et al. | 117—132 |
| 3,269,974 | 8/1966 | Childs | 260—37 |
| 3,321,438 | 5/1967 | Brooker et al. | 260—47 |

TOBIAS E. LEVOW, Primary Examiner

A. P. DEMERS, Assistant Examiner

U.S. Cl. X.R.

117—161, 234, 235, 236, 237; 260—37, 824, 830, 834